US009823771B2

(12) United States Patent
Bae et al.

(10) Patent No.: US 9,823,771 B2
(45) Date of Patent: Nov. 21, 2017

(54) DISPLAY APPARATUS CAPABLE OF IMAGE SCANNING AND DRIVING METHOD THEREOF

(71) Applicant: CRUCIALTEC CO., LTD., Gyeonggi-do (KR)

(72) Inventors: Byung Seong Bae, Gyeonggi-do (KR); Ho Sik Jeon, Chungcheongnam-do (KR); Woo Young Choi, Seoul (KR); Jong Uk Kim, Gyeonggi-do (KR); Jun Suk Lee, Gyeonggi-do (KR); So Hyun Jeong, Chungcheongnam-do (KR); Ju An Yoon, Chungcheongnam-do (KR); Sang A Oh, Seoul (KR)

(73) Assignee: CRUCIALTEC CO., LTD., Asan-si (KR)

( * ) Notice: Subject to any disclaimer, the term of this patent is extended or adjusted under 35 U.S.C. 154(b) by 17 days.

(21) Appl. No.: 14/938,302

(22) Filed: Nov. 11, 2015

(65) Prior Publication Data

US 2016/0132177 A1    May 12, 2016

(30) Foreign Application Priority Data

Nov. 12, 2014  (KR) .......................... 10-2014-0156868
Dec. 26, 2014  (KR) .......................... 10-2014-0190691

(51) Int. Cl.
*G06F 3/041*   (2006.01)
*G06K 9/00*    (2006.01)
(Continued)

(52) U.S. Cl.
CPC ............ *G06F 3/0416* (2013.01); *G06F 3/044* (2013.01); *G06F 3/0412* (2013.01); *G06F 3/0421* (2013.01); *G06K 9/00013* (2013.01)

(58) Field of Classification Search
CPC .... G06F 3/0416; G06F 3/0412; G06F 3/0421; G06F 3/044; G06K 9/00013
See application file for complete search history.

(56) References Cited

U.S. PATENT DOCUMENTS

2009/0295692 A1* 12/2009 Lee .................... G02F 1/13338
                                                          345/87
2011/0164011 A1*  7/2011 Yamamoto .......... G09G 3/3233
                                                          345/207

(Continued)

*Primary Examiner* — Lixi C Simpson
(74) *Attorney, Agent, or Firm* — H.C. Park & Associates, PLC

(57) ABSTRACT

According to an embodiment, the present invention provides a display apparatus capable of image scanning and a driving method thereof.
According to an embodiment, the present invention provides a display apparatus capable of image scanning, including a plurality of contact sensors, each of them being arranged so as not to overlap a unit color pixel of a color filter layer and including only one sensing transistor generating a leakage current corresponding to the strength of light reflected from an outside object, a scan line applied with a selective signal selecting at least a part of the contact sensors among the plurality of contact sensors, and a readout line receiving an output signal corresponding to the amount of electric charge charged in a parasitic capacitance of the sensing transistor by the leakage current from a contact sensor applied with the selective signal.

15 Claims, 11 Drawing Sheets

(51) Int. Cl.
*G06F 3/044* (2006.01)
*G06F 3/042* (2006.01)

(56) References Cited

U.S. PATENT DOCUMENTS

| | | | | |
|---|---|---|---|---|
| 2011/0316809 A1* | 12/2011 | Kim | ...................... | G06F 3/0412 345/174 |
| 2013/0342500 A1* | 12/2013 | Huang | .................. | G06F 3/0416 345/174 |
| 2014/0139490 A1* | 5/2014 | Hwang | .................. | G06F 3/042 345/175 |
| 2016/0098140 A1* | 4/2016 | Lee | ....................... | G06F 3/0416 345/173 |

\* cited by examiner

[Fig. 1]
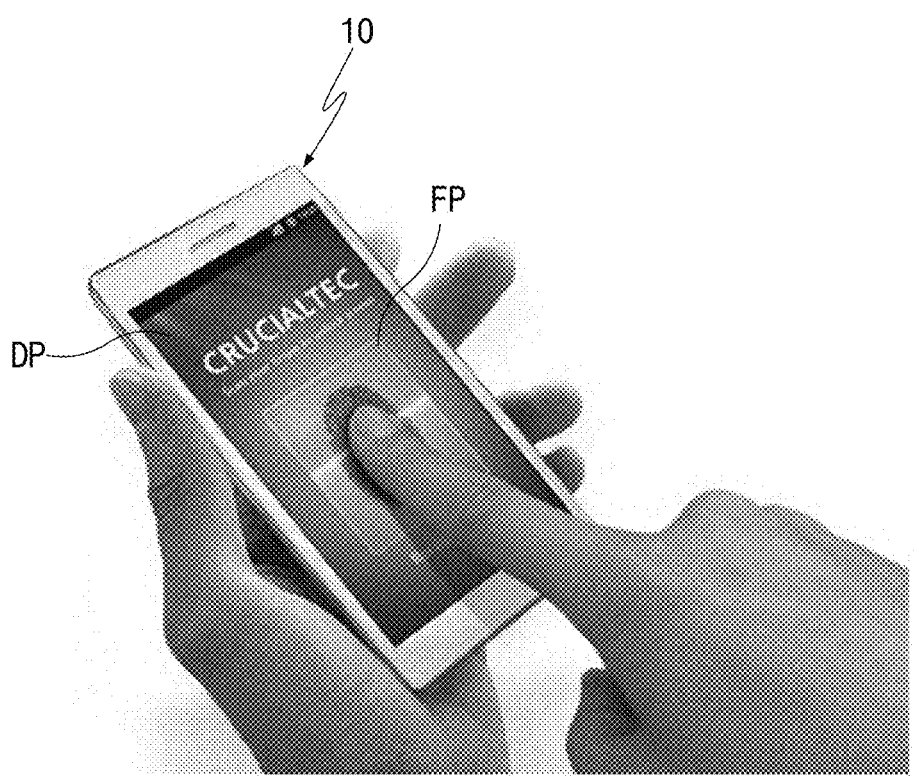

[Fig. 2a]
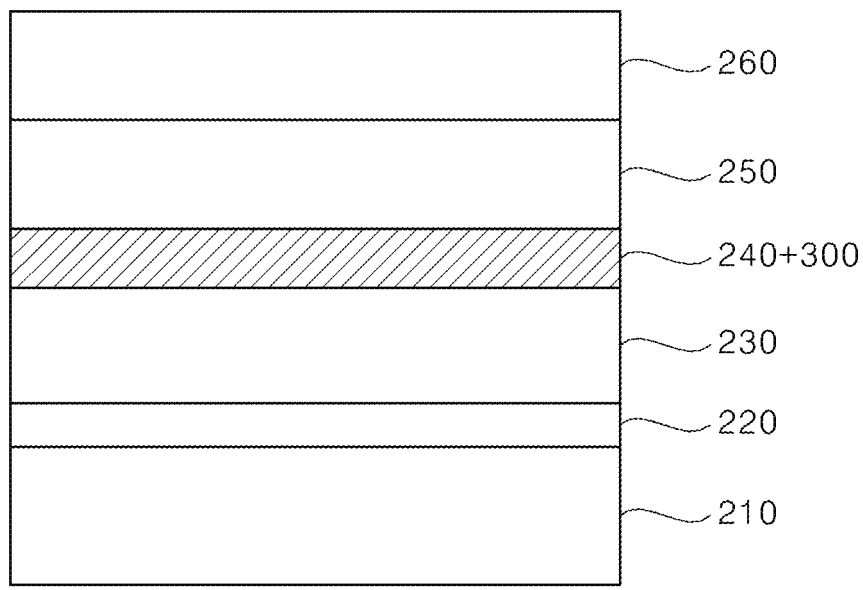
[Fig. 2b]
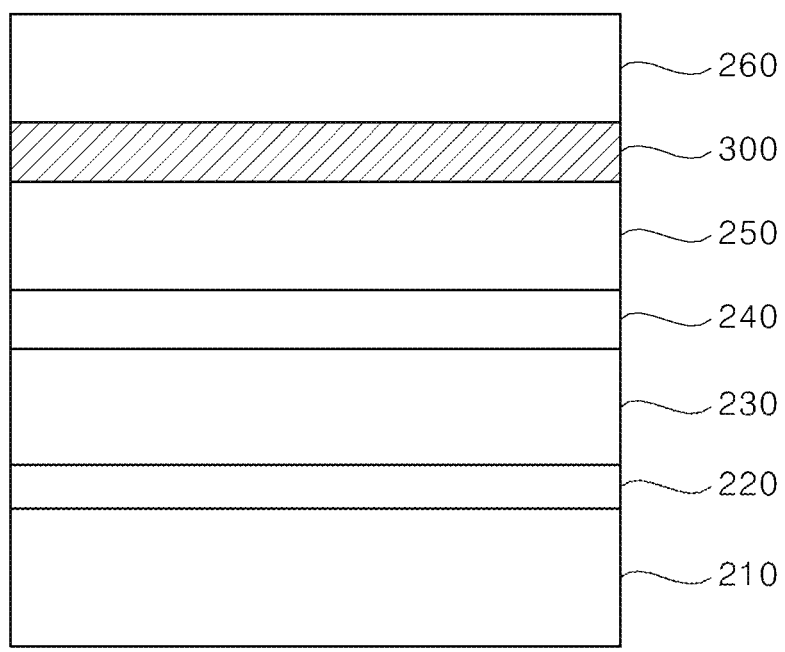

[Fig. 2c]
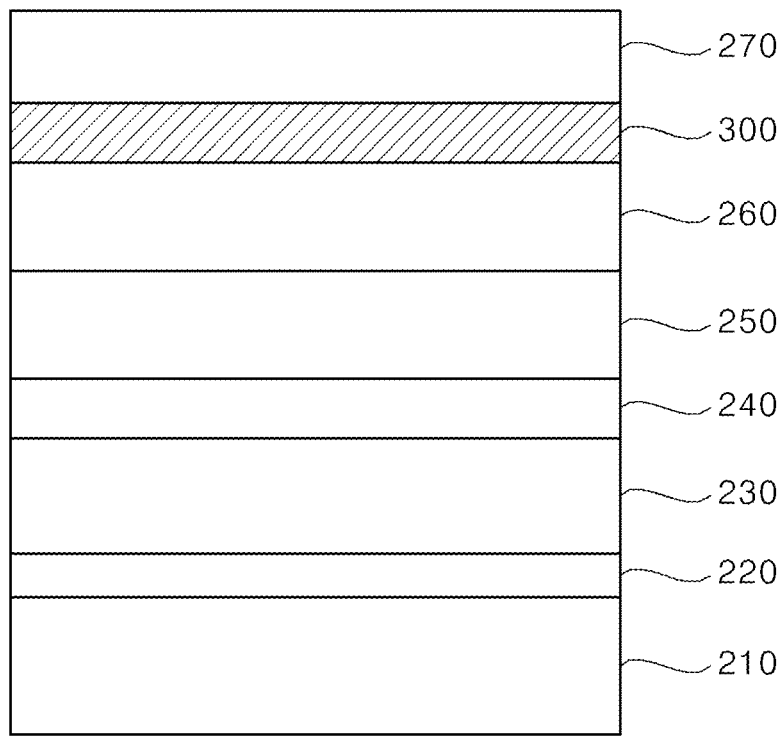
[Fig. 2d]
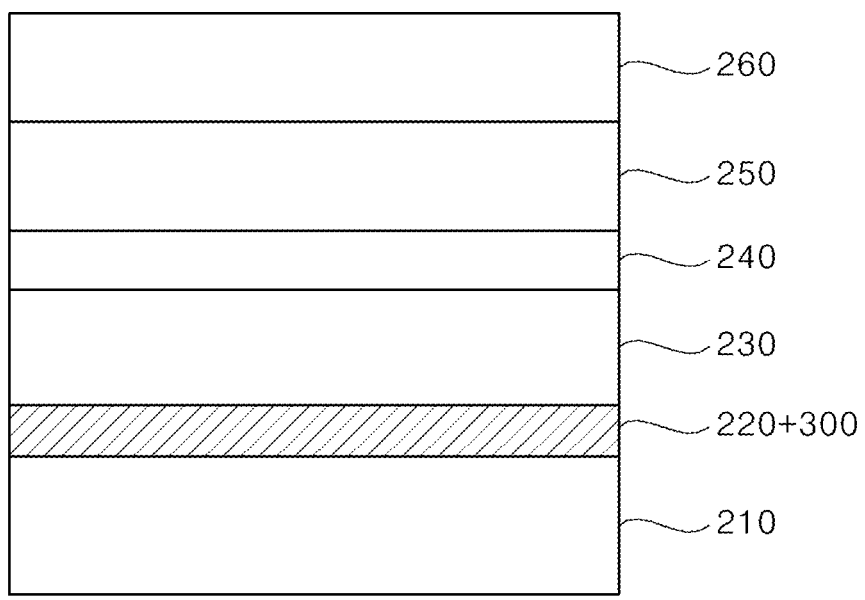

[Fig. 3]
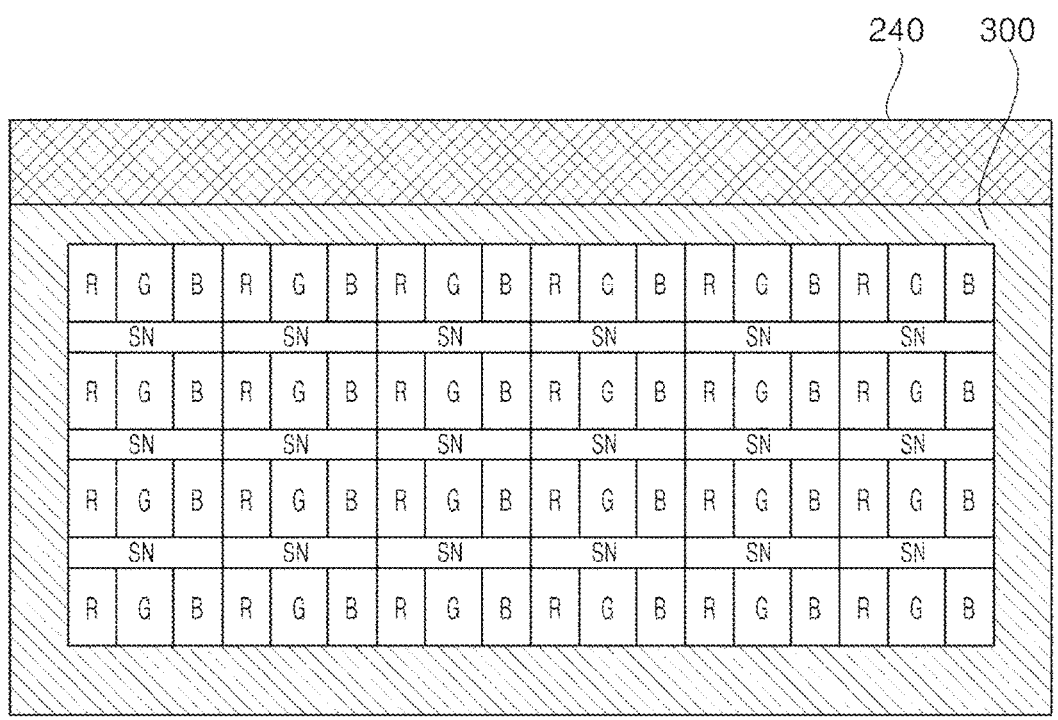

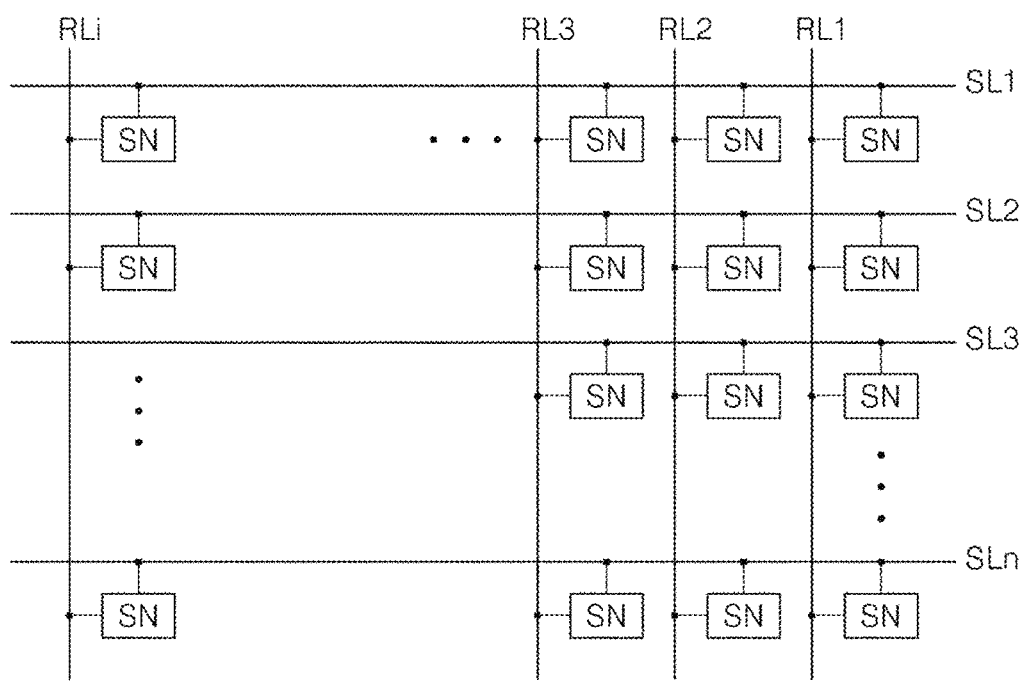
[Fig. 4]

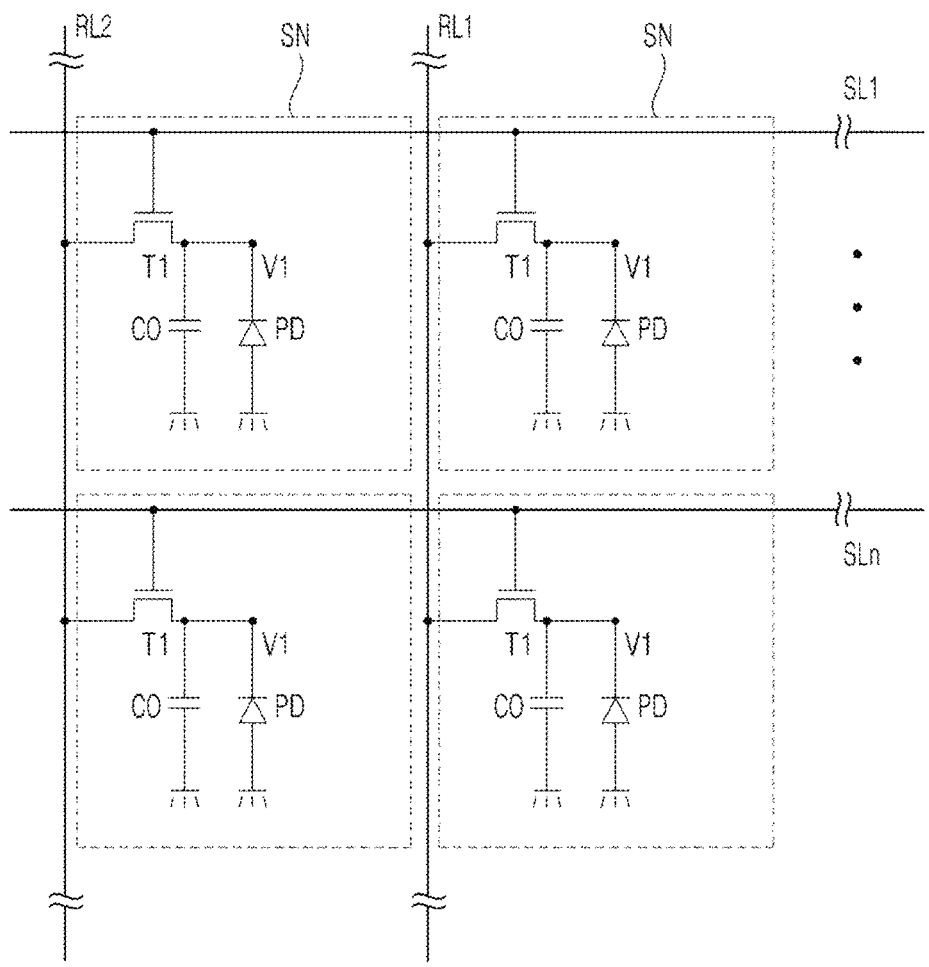
[Fig. 5]

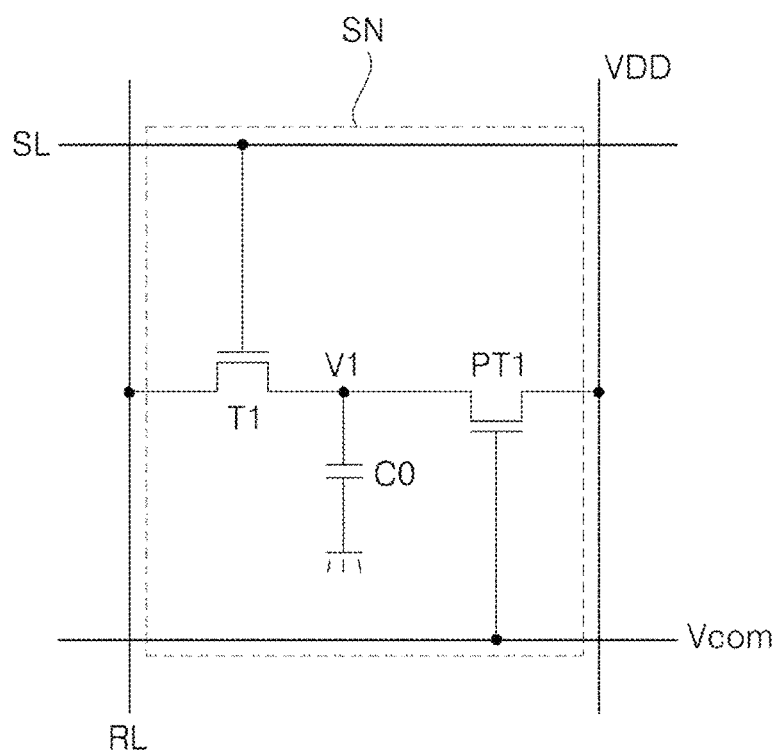
[Fig. 6]

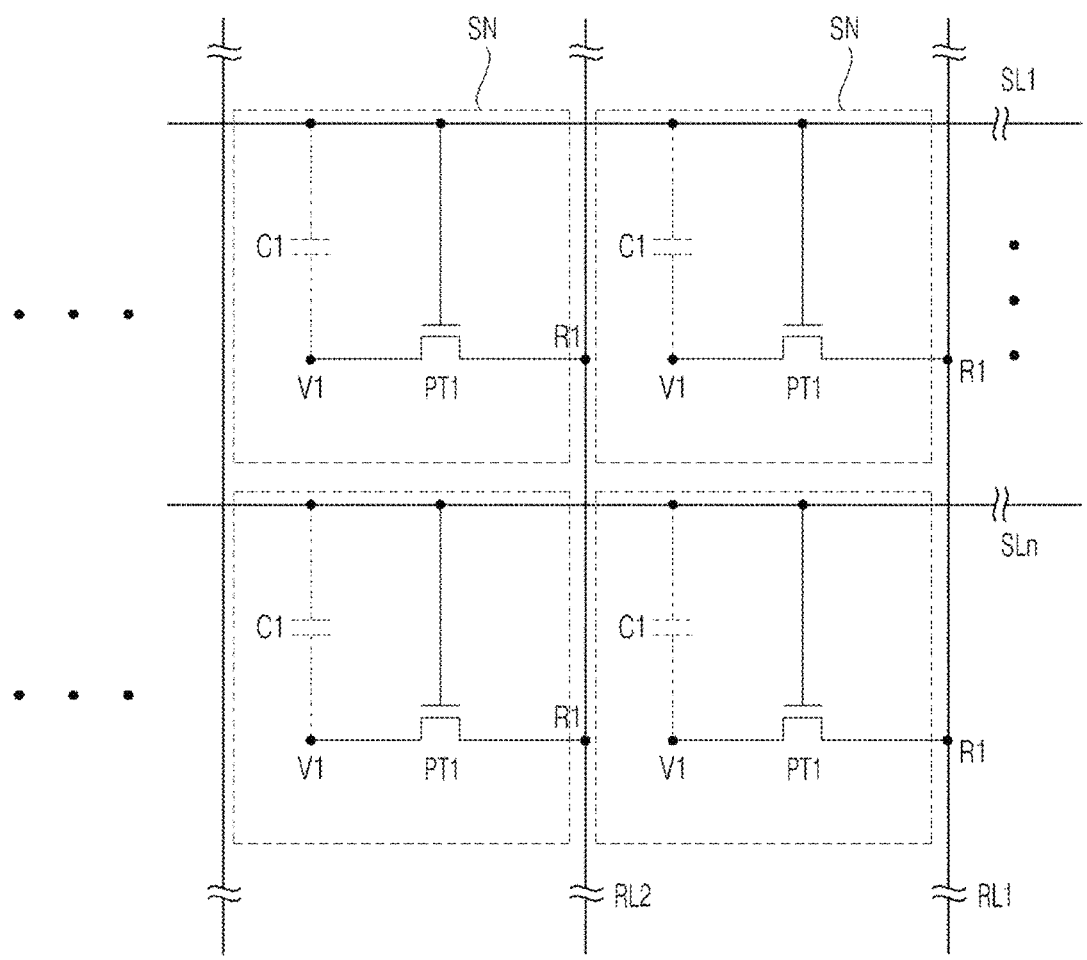
[Fig. 7]

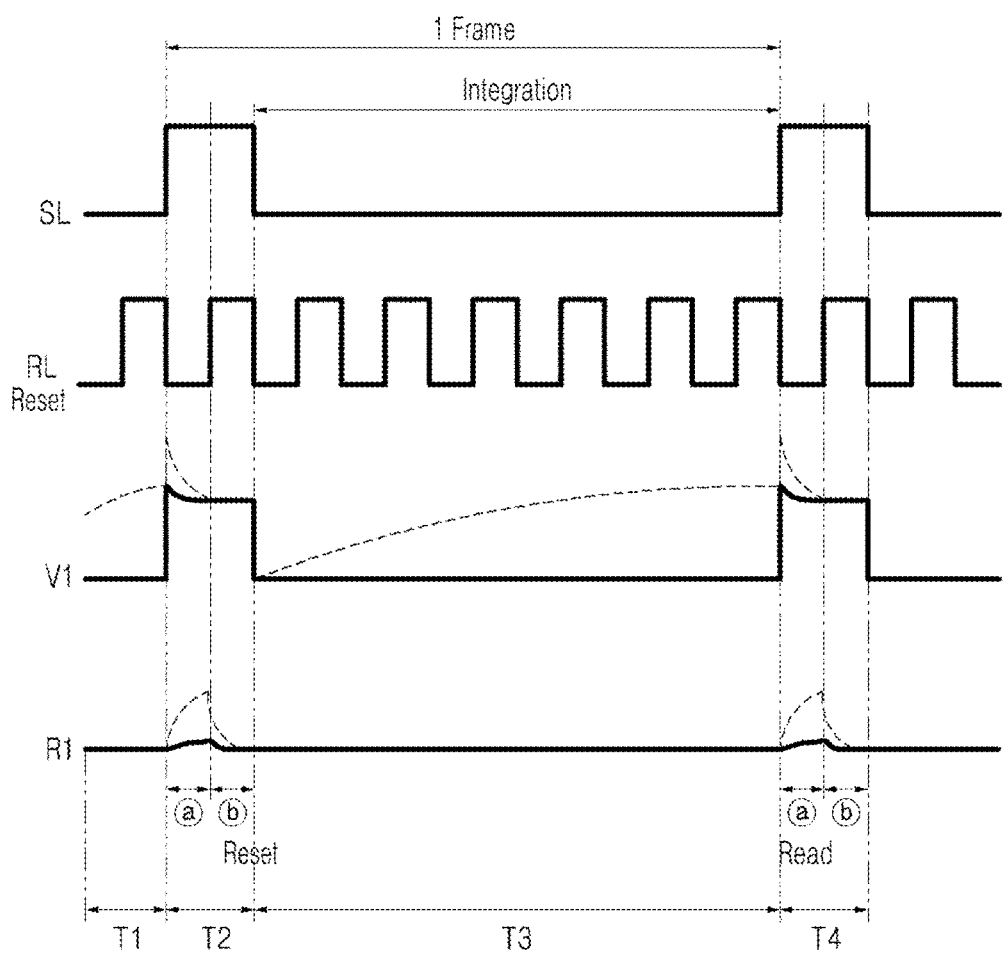
[Fig. 8]

[Fig. 9]
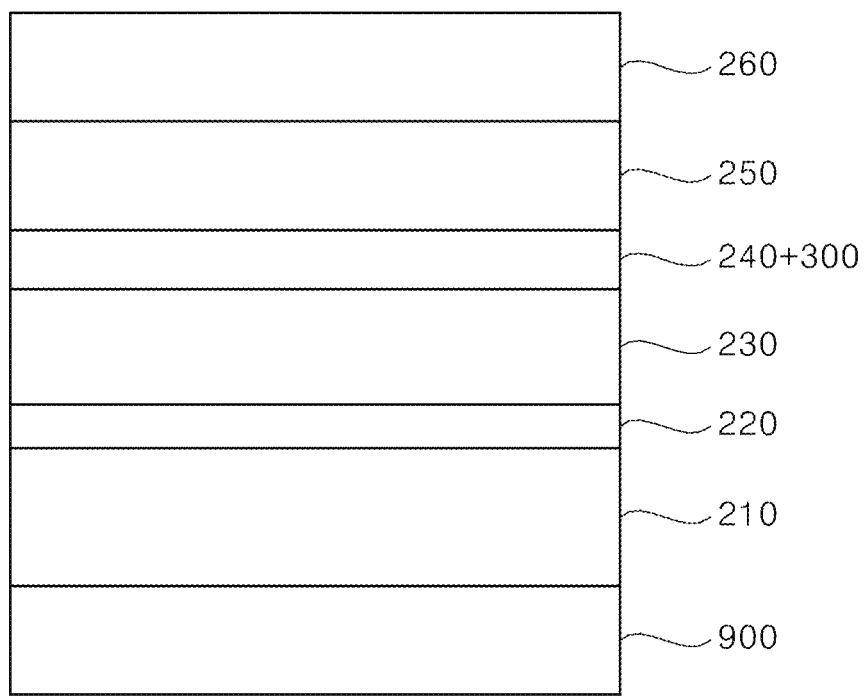

[Fig. 10]
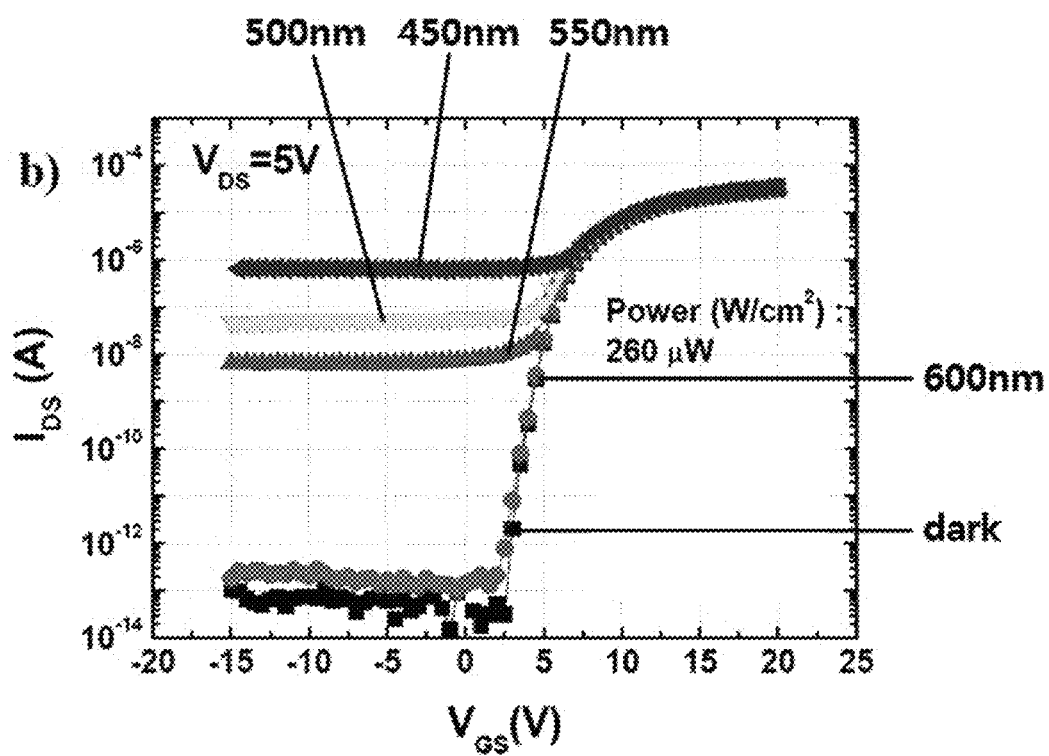

DISPLAY APPARATUS CAPABLE OF IMAGE SCANNING AND DRIVING METHOD THEREOF

CROSS-REFERENCE TO RELATED APPLICATIONS

This application claims the benefit under 35 U.S.C. §119 of Korean Application Nos. 10-2014-0156868, filed on Nov. 12, 2014 and 10-2014-0190691, filed on Dec. 26, 2014, which are hereby incorporated by reference in their entirety.

BACKGROUND

Technical Field

The present invention relates to a display apparatus capable of image scanning and a driving method thereof. More specifically, the present invention relates to a display apparatus capable of image scanning with an aperture ratio improved than the conventional one and a driving method thereof.

Related Arts

A touchscreen panel is a device for inputting user command by touching letters or diagrams displayed on the screen of an image display device with a human finger or other touch means, and is used attached to an image display device. The touchscreen panel converts the touch location touched with the human finger, etc. into electrical signals. The electrical signal is used as an input signal.

The touchscreen panel adopts various touch detection methods such as a resistance membrane method, an optical method, a capacitive method, an ultrasonic wave method, etc. Among them, according to the optical method, the touchscreen panel detects whether a touch is made through the change in optical properties in a corresponding location when a touch generating means contacts the screen of a display apparatus. Due to its properties, there is no limitation in the type of touch generating means in the optical method.

Meanwhile, recently, as security matters are becoming an issue, security issues relating to personal portable devices such as smartphones, tablet PCs, etc. are on the rise. As portable devices are being used more frequently, security is a requisite for e-commerce through portable devices, and according to such needs, biometric data such as fingerprints, iris, face, voice, blood veins, etc. are used.

Among the various biometric information authentication technologies, the most commonly used technology is the authentication technology using fingerprints. Recently, products introducing fingerprint recognition and authentication technology using the same to smartphones and tablet PCs, etc. have been released.

However, in order to graft sensors for fingerprint recognition on portable devices, a separate device for fingerprint recognition needs to be installed, in addition to an image display device, which makes the volume of portable devices bigger.

Also, recently, flexible image display devices are being developed, and in this case, the touchscreen panel applied to the flexible image display device needs to be flexible as well.

Thus, it became necessary to develop a technology granting flexibility, without requiring a separate space for a fingerprint recognition sensor in the portable device, while not bothering the display area.

SUMMARY OF INVENTION

The present invention aims to solve the above problems of the related art. It is an object of the present invention to improve the aperture ratio as compared to the related art and integrate the circuit, by integrating a contact sensor with a display panel to allow the display apparatus to have an image scanning function in the same area.

According to one embodiment of the present invention for achieving the purpose, the present invention provides a display apparatus capable of image scanning, including a plurality of contact sensors, each of them being arranged so as not to overlap a unit color pixel of a color filter layer and including only one sensing transistor generating a leakage current corresponding to the strength of light reflected from an outside object; a scan line applied with a selective signal selecting at least a part of the contact sensors among the plurality of contact sensors; and a readout line receiving an output signal corresponding to the amount of electric charge charged in a parasitic capacitance of the sensing transistor by the leakage current from a contact sensor applied with the selective sensor.

A gate electrode and a drain electrode of the sensing transistor may be connected to the scan line and readout line, respectively.

The parasitic capacitance may be a gate-source overlap capacitance of the sensing transistor.

A sensing transistor source electrode potential of the contact sensor may increase according to the coupling phenomenon by the parasitic capacitance according to the selective signal applied.

The plurality of contact sensors may be arranged at an upper side or a lower side of a color filter layer extracting color in pixel unit from light of a backlight source.

The plurality of contact sensors may be arranged between one of a first substrate and a second substrate forming the display apparatus and a cover window protecting the display apparatus.

The plurality of contact sensors may be arranged at an upper part of a cover window protecting the display apparatus, and a protective layer for protecting the contact sensors may be formed at the upper part of the plurality of contact sensors.

The plurality of contact sensors may be arranged on the same layer as a thin-film transistor layer where driving circuits for driving the display apparatus are formed.

A source electrode of the sensing transistor may be reset by applying the reset signal to the readout line while the selective signal is not applied.

The display apparatus may further include an IC chip determining whether contact is made to an upper part of the plurality of contact sensors and contact condition based on an output signal from a plurality of contact sensors detected by the readout lines.

Meanwhile, according to another embodiment of the present invention, the present invention provides a display apparatus capable of image scanning, including a plurality of contact sensors, each of them being arranged in an area not overlapping a unit color pixel area of a color filter layer in matrix form, wherein each of the contact sensors includes a sensing transistor generating an electric charge corresponding to the strength of light reflected from an outside object and a parasitic capacitance accumulating an electric charge generated from the sensing transistor while a selective signal is not applied to the sensing transistor, wherein a signal is outputted based on the electric charge accumulated in the parasitic capacitance when the selective signal is applied to the sensing transistor.

The display apparatus may further include a scan line applying a selective signal to a gate electrode of the sensing transistor, and a readout line connected to a drain electrode of the sensing transistor, for detecting a signal outputted from the sensing transistor applied with the selective signal.

Meanwhile, according to another embodiment of the present invention, the present invention provides a method for scanning an image in a display apparatus, the method including charging a parasitic capacitance of the sensing transistor included in each contact sensor and generating a leakage current corresponding to the strength of light reflected from an outside object by applying a selective signal of a low level to at least a part of the plurality of contact sensors, each of them being arranged in the area not overlapping a unit color pixel area of a color filter layer in matrix form; increasing a source electrode potential of the sensing transistor by coupling of the parasitic capacitance by applying a selective signal of a high level to the at least a part of the contact sensors, and determining whether contact is made to the plurality of contact sensors and contact condition by detecting an output signal varying according to the increase of the source electrode potential from contact sensors applied with the selective signal of the high level.

The method for scanning an image may further include resetting a readout line connected to the drain electrode after a source electrode potential of the sensing transistor becomes the same as a drain electrode potential outputted with the output signal outputting the output signal, after the step of detecting the output signal.

The method for scanning an image may further include resetting a source electrode potential of the sensing transistor by applying a reset signal to the readout line while applying a selective signal of low level.

According to another embodiment of the present invention, the present invention provides a method for scanning an image in a display apparatus, the method including receiving light reflected from an outside object on at least a part of the plurality of contact sensors by illuminating light from different wavelength areas in order, charging a parasitic capacitance of the contact sensor by a leakage current generated according to the light received by applying a selective signal of a low level to at least part of the plurality of contact sensors, detecting output signals varying according to the amount of electric charge of the parasitic capacitance by applying a selective signal of a high level to at least a part of the contact sensors, and determining whether contact is made to the plurality of contact sensors and contact condition by combining each of the detected output signals for light illuminated from the different wavelength areas.

According to an embodiment of the present invention, the contact sensor supplied for each pixel of the display panel consists of only one sensing transistor. Thus, the aperture ratio of the entire display panel may be improved.

Also, according to an embodiment of the present invention, the source electrode potential of the sensing transistor included in each contact sensor is initiated by a readout line reset signal. Thus, a separate reset circuit is not required, and accordingly the area of the integrated circuit may be reduced.

Meanwhile, according to an embodiment of the present invention, the size of the contact sensors integrated with the display apparatus and the distance between them are formed to an extent to allow both touch detection and fingerprint recognition. Thus, touch detection and fingerprint recognition are both possible on the display apparatus, and the resolution of touch detection may be improved automatically.

According to an embodiment of the present invention, contact sensors capable of fingerprint recognition are integrated with the display apparatus. Thus, a display area and fingerprint recognition area do not have to be formed separately. Accordingly, there could be an advantage in an area when implementing the display area.

BRIEF DESCRIPTION OF DRAWINGS

FIG. 1 is a view illustrating an image of an electronic equipment according to an embodiment of the present invention;

FIGS. 2a, 2b, 2c and 2d are cross-sectional views illustrating the constitution of a display apparatus having an image scanning function according to an embodiment of the present invention;

FIG. 3 is a plan view illustrating the constitution of the display apparatus according to an embodiment of the present invention;

FIG. 4 is a view illustrating the constitution of a sensor array layer implementing the image scanning function according to an embodiment of the present invention;

FIG. 5 is a circuit diagram illustrating a first embodiment of the contact sensor SN illustrated in FIG. 4;

FIG. 6 is a circuit diagram illustrating another embodiment of the contact sensor SN of FIG. 4;

FIG. 7 is a circuit diagram illustrating the constitution of a contact sensor that can be applied to a display apparatus according to an embodiment of the present invention;

FIG. 8 is a timing diagram for explaining the operation of a contact sensor SN according to an embodiment of the present invention;

FIG. 9 is a view for explaining a method performing fingerprint recognition for a display apparatus having an image scanning function according to an embodiment of the present invention; and FIG. 10 is a graph illustrating a difference in the property of the contact sensor according to wavelength area of light source in a method for recognizing fingerprint according to an embodiment of the present invention.

DETAILED DESCRIPTION

Hereinafter, the present invention will be explained with reference to the accompanying drawings. The present invention, however, may be modified in various different ways, and should not be construed as limited to the embodiments set forth herein. Also, in order to clearly explain the present invention, portions that are not related to the present invention are omitted, and like reference numerals are used to refer to like elements throughout.

Throughout the specification, it will be understood that when an element is referred to as being "connected to" another element, it may be "directly connected to" the other element, or intervening elements or layers may be present. Also, it will also be understood that when a component "includes" an element, unless there is another opposite description thereto, it should be understood that the component does not exclude another element but may further include another element.

In the present specification, "contact recognition" means a function recognizing an object in contact with a surface, and it should be understood to cover recognition of fingerprint or touch by a human finger, or recognition of touch by other touch generating means.

Hereinafter, examples of the present invention will be explained in more detail with reference to the accompanying drawings.

FIG. 1 is a view illustrating an image of an electronic equipment according to an embodiment of the present invention.

Referring to FIG. 1, an electronic equipment 10 according to an embodiment includes a display apparatus DP.

The electronic equipment 10 may be a digital equipment including wireless or wired communication functions or other functions. For example, it may be a digital equipment with operation skills including a memory means and a microprocessor, such as mobile phones, navigations, web pads, PDAs, workstations, personal computers (e.g., laptop computers, etc.). Smartphone will be presented as a preferable example, but electronic equipment is not necessarily limited thereto.

A display apparatus DP is formed on a surface of an electronic equipment 10. Preferably, as illustrated in FIG. 1, the display apparatus may be formed on a front surface of an electronic equipment 10 and implemented as a touchscreen panel performing the function as an input device as well.

According to an embodiment of the present invention, the display apparatus DP may perform the function of recognizing a fingerprint, in addition to detecting whether contact is made by a touch generating means (for example, finger, etc.) and the contact location.

Specifically, when driving a first application, the display apparatus DP may function as a touchscreen for driving a specific function, and when driving a second application, the fingerprint recognition function may be implemented in the fingerprint input window FP area displayed on the display apparatus DP or the entire area of the display apparatus DP.

As will be described below, touch by a touch generating means or contact by a ridge and valley of a fingerprint is made by sensors consisting of a plurality of rows and columns. In order to recognize fingerprints, contact by the ridge and contact by the valley need to be distinguished from one another. Thus, the resolution of sensing contact associated with the number of sensors included in the display apparatus DP should be formed to an extent to distinguish the contact by the ridge from the contact by the valley of fingerprints.

FIGS. 2a, 2b, 2c and 2d are cross-sectional views illustrating the constitution of a display apparatus having an image scanning function according to an embodiment of the present invention. FIGS. 2a, 2b, 2c and 2d present a constitution integrating the image scanning function into a liquid crystal display (LCD) as an example.

Referring to FIGS. 2a, 2b, 2c and 2d, the LCD includes a first substrate 210, a thin film transistor layer 220, a liquid crystal layer 230, a color filter layer 240, a second substrate 250, and a cover window 260, layered in order.

The LCD is operated by a principle implementing the desired color and image by allowing light illuminated from a back light unit (BLU) placed on the lower part of a first substrate 210 to penetrate into a liquid crystal layer 230, and then pass through a color filter layer 240 implementing colors by extracting colors in pixel units. The thin film transistor layer 220 has a function of delivering or controlling electronic signals, and the liquid crystal present on the liquid crystal layer 230 controls the penetration of light by varying molecular structure according to the applied electronic signal.

The sensor array layer 300 performing the function of detecting contact by a touch generating means or recognizing fingerprints according to an embodiment of the present invention, i.e., performing the image scanning function, may be arranged on a certain area of the LCD.

First, as illustrated in FIG. 2a, the sensor array layer 300 according to an embodiment may be arranged in a layer adjacent the color filter layer 240. In this case, the sensor array layer 300 may be arranged in a lower area of the color filter layer 240 or in an area between a color filter area 240 and a second substrate 250.

Next, as illustrated in FIG. 2b, the sensor array layer 300 according to an embodiment may be arranged between a second substrate 250 and a cover window 260, and as illustrated in FIG. 2c, the sensor array layer may be arranged in the upper part of the cover window 206 to protect the display apparatus.

As illustrated in FIG. 2c, when a sensor array layer 300 is arranged in the upper part of the cover window 260, a separate protective layer 270 should be formed on top of it in order to protect the sensor array layer 300.

Meanwhile, as illustrated in FIG. 2d, the sensor array layer 300 according to an embodiment may be formed on the same layer as the thin film transistor layer 220 implemented with circuits for driving the display apparatus.

In the above, an example of implementing the display apparatus as an LCD was explained. However, it is obvious that the display apparatus may be implemented as other types of display apparatuses such as an organic light emitting diode (OLED) display apparatus or an electro phoretic display (EPD), etc.

The OLED display apparatus may be formed in a structure having OLED elements formed with electrode layers on both surfaces, arranged on the substrate. However, in this case, the sensor array layer 300 having an image scanning function according to an embodiment of the present invention may be formed on the upper part of the substrate or the upper part of the OLED element, etc.

FIG. 3 is a plan view illustrating the constitution of the display apparatus according to an embodiment of the present invention.

FIG. 3 illustrates a color filter layer 240 and a sensor array layer 300. As illustrated above, the sensor array layer 300 may be formed on a relatively upper part with respect to the color filter layer 240, or on its lower part.

The sensor array including a plurality of contact sensors according to an embodiment may be formed on the front surface of the display, and may be formed on a certain area of the display according to another embodiment. When the sensor array is formed on a certain area of the display, an area without a contact sensor may be configured so that there is no step between the area and an area with a contact sensor through passivation (not shown).

The sensor array layer 300 includes a plurality of contact sensors SN. The contact sensor SN may be implemented as a visible ray sensor sensing light of visible ray area or an infrared ray sensor sensing light of infrared ray area.

The color filter layer 240 may be configured to include red pixels R indicating red images, green pixels G indicating green images, and blue pixels B indicating blue images. Each one of the red pixel R, green pixel G, and blue pixel B forms one unit pixel, and it may be explained that these unit pixels are formed in the form of a matrix consisting of a plurality of rows and columns. Accordingly, one unit pixel may include one contact sensor SN.

According to an embodiment, the contact sensor SN is formed on the sensor array layer 300, and when viewed from the top, the sensing circuit (e.g., transistor and wirings) of the contact sensor SN is arranged in an area not overlapping the red pixel R, green pixel G and blue pixel B of the color filter layer 240, and the pixel electrode of the contact sensor SN may be arranged in an area overlapping at least a part of the color pixels (R, G or B) as a transparent electrode material such as ITO, etc. or in a certain area not overlapping the color pixels. FIG. 3 illustrates providing a contact sensor SN at the lower part of the unit pixel. However, the contact sensor may be provided at the upper part or side surface part, etc. of the unit pixel. Also, one of the red pixel R, green pixel G, and blue pixel B may be made to be relatively smaller so as to place the sensing circuit of the contact sensor SN in a corresponding location.

According to another embodiment, when using a transparent electrode material for the transistor and wiring, the contact sensor SN may be formed to overlap the red pixel R, green pixel G and blue pixel B of the color filter layer 240 up to the sensing circuit, in addition to the pixel electrode, in the sensor array layer 300. Accordingly, since the contact sensor SN may be formed to overlap unit pixels, the resolution of image sensing may increase by arranging at least two contact sensors SN for each unit pixel, and the sensitivity of image sensing may be improved by forming the unit contact sensor SN to be larger.

FIG. 4 is a view illustrating the constitution of a sensor array layer implementing the image scanning function according to an embodiment of the present invention.

Referring to FIG. 4, the sensor array layer 300 includes a plurality of scan lines (SL1, SL2, . . . SLn) and a plurality of readout lines (RL1, RL2, . . . RL1). The plurality of scan lines (SL1, SL2, . . . SLn) are provided with scan signals in order, and the plurality of readout lines (RL1, RL2, . . . RL1) receive signals outputted from the contact sensor SN and deliver them to a circuit (not shown) which processes the signals.

According to an embodiment, the scan signal provided to the plurality of scan lines may be provided from a scan driver of the sensor array layer 300.

The scan lines (SL1, SL2, . . . SLn) and readout lines (RL1, RL2, . . . RL1) are arranged to intersect one another, and at least one contact sensor SN may be formed at each intersection.

FIG. 5 is a circuit diagram illustrating a first comparative example of the contact sensor SN illustrated in FIG. 4. Referring to FIG. 5, the contact sensor SN includes a photodiode PD, a transistor T1, and a sensing capacitor C0.

A photodiode (PD) is an element converting optical energy into electric energy. When light reaches a photodiode (PD), a current flows. A cathode of a photo diode (PD) is connected to the source of the switch transistor T1 and an anode is connected to ground voltage. Such photodiode (PD) may be implemented as organic light emitting diode (OLED), quantum dot (QD), or transistor, etc.

One end of a sensing capacitor C0 is connected to the source of a switch transistor T1, and the other end of the sensing capacitor C0 is connected to ground voltage. A response to the change of the potential of one end of the sensing capacitor C0 is delivered to the readout lines (RL1, RL2), and the signals delivered to the readout lines (RL1, RL2) are delivered to a predetermined IC chip. The gate electrode of the switch transistor T1 is connected to scan lines (SL1~SLn), the drain electrode is connected to the readout lines (RL1, RL2), and the source electrode is connected to the cathode of the photodiode (PD). Such switch transistor T1 may be implemented as transistors such as hydrogenated amorphous silicon (a-Si:H), poly silicon (Poly-Si), oxide transistor, etc. Also, it is not limited thereto, and may be implemented as an organic thin film transistor (organic TFT), etc.

The method of sensing light received from outside, i.e., light received at the contact sensor SN being reflected by a contact means, by the contact sensor SN, and delivering a signal corresponding to the size of the sensed light will be explained in the following.

A predetermined voltage is applied to the readout lines (RL1, RL2). A separate circuit (not shown) for applying voltage may be further included. When a selective signal for turning on the switch transistor T1 is applied to the scan lines (SL1~SLn), the potential V1 of an end of the sensing capacitor C0 is set with a voltage applied to the readout lines (RL1, RL2). That is, by turning on the switch transistor T1, the sensing capacitor C0 is set with a voltage applied to the readout lines (RL1, RL2).

When the light reflected from an outside object is not received, a current does not flow in the photodiode (PD), and accordingly the potential (V1) of an end of the sensing capacitor C0 is maintained at the set voltage.

The readout lines (RL1, RL2) are reset with a predetermined period. For example, after resetting the readout lines (RL1, RL2) to a potential of 0V, when the switch transistor T1 is turned on by inputting the next selective signal to the scan lines (SL1~SLn), the electric charge stored in the sensing capacitor C0 is shared with the parasitic capacitance (not shown) of the readout lines (RL1, RL2).

When the voltage applied to the readout lines (RL1, RL2) is referred to as Vdc, the parasitic capacitance of the readout lines (RL1, RL2) is referred to as Cpl, and an end potential of the sensing capacitor C0 is referred to as V1, the following equation is established.

$$V1(C0 + Cpl) = Vdc \times C0 \quad \text{[Equation 1]}$$
$$V1 = \frac{Vdc \times C0}{C0 + Cpl}$$

However, when receiving the light reflected from an outside object, a current flows in the photodiode PD. Accordingly, there is a difference in the total amount of electric charge shared by the sensing capacitor C0 and the parasitic capacitance of the readout lines RL1 and RL2, and the potential V1 of an end of the sensing capacitor C0 varies in Equation 1.

As the strength of the incident light increases, the size of the current flowing in the photodiode PD increases, and accordingly the change in the potential V1 of an end of the sensing capacitor C0 increases, and the total amount of electric charge shared by the sensing capacitor C0 and the parasitic capacitance of the readout lines RL1 and RL2 increases as well. Thus, an output signal of different levels is obtained from the readout lines RL1 and RL2 according to the strength of the incident light at the photodiode PD.

The method explained in the above is a method using the phenomenon of sharing electric charges between the sensing capacitor C0 and the parasitic capacitance of the readout lines RL1 and RL2. Thus, the level difference of output signal actually obtained from the readout lines RL1 and RL2 becomes the difference from the result of sharing electric charge with the sensing capacitor C0. Accordingly, the difference in signal size and level of output signal according to circumstance may not be great enough. Thus, a separate circuit for amplifying the output signal of the readout lines RL1 and RL2 is required.

FIG. 6 is a circuit diagram illustrating another comparative example of the contact sensor SN of FIG. 4.

Referring to FIG. 6, a contact sensor SN may include a switching transistor T1, a sensing transistor PT1, and a sensing capacitor C0.

A gate electrode of a switching transistor T1 is connected to a scan line SL, a drain electrode is connected to a readout line RL, and a source electrode is connected to a first electrode among the two electrodes of the sensing capacitor C0. Meanwhile, a drain electrode of a sensing transistor PT1 is connected to an input voltage line VDD, a source electrode is connected to a first electrode of the sensing capacitor C0, and a gate electrode is connected to a common voltage line Vcom.

When light reflected from an outside object is supplied to a sensing transistor PT1, a semiconductor of a channel part made of hydrogenated amorphous silicon or poly silicon forms a current. In this regard, such current flows in the direction of the sensing capacitor C0 and the switching transistor T1 by an input voltage inputted to the input voltage line VDD.

When a selective signal is inputted to the scan line SL, the current flows through the readout line RL. Even in this case, the size of the current actually flowing to the readout line RL by the parasitic capacitance formed around the readout line RL cannot help but decrease.

FIG. 7 is a circuit diagram illustrating the constitution of a contact sensor that can be applied to a display apparatus according to an embodiment of the present invention.

The contact sensor SN according to an embodiment of the present invention may be formed to be included in a sensor array layer 300 as explained with reference to FIGS. 2a, 2b, 2c, 2d and 4.

Each contact sensor SN is configured to include only one sensing transistor PT1. The sensing transistor PT1 generates an amount of electric charge corresponding to the strength of the light reflected from an outside object. In other words, the sensing transistor PT1 receives light reflected from the outside object, and generates a leakage current corresponding to the strength of the received light.

The capacitance C1 illustrated in FIG. 7 is not actually supplied, but is merely a parasitic capacitance caused by the intersection of signal wirings of the readout line and scan line, i.e., gate-source overlap capacitance of TFT Cgso.

A first electrode of a sensing transistor PT1 is connected to scan lines SL1~SLn, and a second electrode is connected to readout lines RL1 and RL2. A third electrode may be arranged in a floating state not electrically connected to any constituent. The first electrode, second electrode and third electrode may be a gate electrode, a drain electrode and a source electrode, respectively. The sensing transistor PT1 may be implemented as a transistor such as a hydrogenated amorphous silicon (a-Si:H), poly silicon (poly-Si), oxide transistor, etc. Also, it is not limited thereto, and may be implemented as an organic thin film transistor (organic TFT), etc.

FIG. 8 is a timing diagram for explaining the operation of a contact sensor SN according to an embodiment of the present invention.

Referring to FIGS. 7 & 8, the operation of the contact sensor SN according to an embodiment of the present invention may be explained as shown below.

FIG. 8 illustrates signals supplied to scan lines SL1~SLn. It should be understood that a selective signal is supplied to scan lines SL1~SLn during the high section. A specific contact sensor SN is selected by applying a selective signal, and a signal from the corresponding contact sensor SN is outputted. Hereinafter, "SL" denotes a scan line signal. Also, RL Reset is a signal for resetting readout lines RL1 and RL2, and reset signal is supplied to the high section and readout lines RL1 and RL2 are reset.

Meanwhile, V1 denotes a source electrode potential of a sensing transistor PT1, and R1 denotes potential of the point connecting a drain electrode of a sensing transistor PT1 and readout lines RL1 and RL2. In the timing diagram of V1 and R1, the solid lines indicate the case where light reflected by an outside object is not supplied to the sensing transistor PT1 (dark), and the broken lines indicate the case where the light reflected by an outside object is supplied to the sensing transistor PT1 (light). The outside object may be a touch generating means, or a fingerprint of a human. Human fingers include ridges and valleys, and light of different amounts is reflected according to whether a ridge contacted each sensing transistor PT1 or the valley contacted each sensing transistor PT1.

Frame 1 may be defined as the period from when the scan line signal SL reaches the next high level after reaching a high level. During a section where a high level signal is applied to scan lines SL~SLn (T2), coupling occurs by a parasitic capacitance C1, and the potential V1 of a source electrode of the sensing transistor PT1 increases. Specifically, the potential of scan lines SL~SLn increases by applying high level signal, and accordingly the source electrode potential V1 of the sensing transistor PT1 increases by the coupling phenomenon of the parasitic capacitance C1. Thereafter, when the scan line signal SL drops to low level, the source electrode potential V1 of the sensing transistor PT1 also drops by the coupling phenomenon of the parasitic capacitance C1, and may be reset to the initial value.

First, the case where light reflected by an outside object is not supplied to the sensing transistor PT1 is explained in the following. Since light is not supplied to the sensing transistor PT1, leakage current is not formed in the sensing transistor PT1. Accordingly, during a section where the scan line signal SL continues to be a low level (T1), the parasitic capacitance C1 is not charged with electric charge.

Referring to the timing diagram of V1 illustrated in solid lines in FIG. 8, when the scan line signal SL is converted into a high level (T2), the source electrode potential V1 of the sensing transistor PT1 increases to the same level as the potential of the scan line signal SL by the coupling phenomenon.

Thereafter, while the scan line signal SL drops to a low level again (T3), when the readout line reset signal RL Reset is converted into high, as shown in the timing diagram of R1 illustrated in solid lines in FIG. 8, the readout lines RL1 and RL2 are reset as reset voltage, and accordingly, as illustrated in the timing diagram of V1 illustrated in solid lines in FIG. 8, the source electrode potential V1 of the sensing transistor PT1 also drops to a low level and is reset. In this case, the source electrode potential V1 of the sensing transistor PT1 may drop to be even lower than the low level according to the coupling phenomenon between the scan line signal SL and source electrode of the sensing transistor PT1.

According to this principle, the potential of the scan line signal SL and the source electrode potential V1 of the sensing transistor PT1 are always maintained at the same level. Thus, the parasitic capacitance C1 is not charged with electric charge. Also, even while the scan line signal SL is at a high level, there is no current flowing into the readout lines (RL1, RL2). Accordingly, the potential R1 of the point connecting the sensing transistor PT1 and the readout lines RL1 and RL2 is maintained at the same level when the scan line signal SL is at a high level and at a low level.

Next, the case where light reflected by an outside object is supplied to the sensing transistor PT1 is explained in the following. Even in a section where the scan line signal SL is maintained at a low level (T1), the parasitic capacitance C1 is charged by the leakage current of the sensing transistor PT1 formed by light. Accordingly, as illustrated in the timing diagram of V1 illustrated in broken lines in FIG. 8, the source electrode potential V1 of the sensing transistor PT1 gradually increases.

When the scan line signal SL is converted into high level (T2), the source electrode potential V1 of the sensing transistor PT1 increases by the coupling phenomenon of the parasitic capacitance C1. In this regard, since the parasitic capacitance C1 is already charged in section T1, the potential V1 of the parasitic capacitance C1 at the starting point of section T2 is relatively higher than a case where the light is not supplied. That is, when compared with the case where there is no reflected light, since the parasitic capacitance C1 is charged during section T1, there is a difference in increase of potential by the coupling phenomenon according to the difference in charged amount.

Meanwhile, during section T2, as the scan line signal SL reaches a high level, the electric charges charged at the parasitic capacitance C1 are delivered to the readout lines RL1 and RL2 through the sensing transistor PT1. Due to this, the potential R1 at the point where the sensing transistor PT1 and readout lines RL1 and RL2 are connected, i.e., the drain electrode potential R1 of the sensing transistor PT1, gradually increases (section ⓐ), and the amount of electric charge charged at the parasitic capacitance C1 decreases. Therefore, the source electrode potential V1 of the sensing transistor PT1 gets lower (section ⓑ), and this proceeds until the source electrode potential V1 of the sensing transistor PT1 becomes the same as the potential R1 of the drain electrode.

When a reset signal (RL reset) is inputted to the readout lines RL1 and RL2, the potential of the readout lines RL1 and RL2 gradually decreases, so as to be lowered to a level where the scan line signal SL is maintained at a low level (section ⓑ). A reset signal (RL reset) of the readout lines RL1 and RL2 is supplied periodically. Due to this, the potential R1 of the readout lines RL1 and RL2 may be reset periodically. The cycle for the potential R1 of the readout lines RL1 and RL2 to be reset may be formed to be shorter than the time for providing a signal of a high level to the scan line signal SL, i.e., the time for providing a selective signal.

When the scan line signal SL is converted into a low level (T3), the parasitic capacitance C1 is charged with the leakage current formed by the sensing transistor PT1 again.

When light reflected from an outside object is supplied to a sensing transistor PT1, the parasitic capacitance C1 is charged with the leakage current. Also, while the scan line signal SL is at a high level, the source electrode potential V1 of the sensing transistor PT1 increases greatly compared to a normal case (when light is not supplied). Accordingly, in a section before the readout line RL1 and RL2 is reset (section ⓐ), the pattern of the potential R1 of the point connecting the drain electrode of the sensing transistor PT1 to the readout lines RL1 and RL2 differs from the normal case.

Thus, in a section where the scan line signal SL is maintained at a high level, which is before the readout lines RL1 and RL2 are reset (section ⓐ), when observing the change in the drain electrode potential R1 of the sensing transistor PT1, or the potential R1 of the point connecting the sensing transistor PT1 and the readout 1 lines RL1 and RL2, or more broadly, the change in the potential R1 of the read out lines RL1 and RL2, it may be determined whether light reflected from an outside object is supplied. Also, according to the amount of light supplied, the amount of leakage current from the sensing transistor PT1 accumulated at the parasitic capacitance C1 would vary. Thus, the condition of contact (contact strength or contact area, etc.) may be known by detecting change in potential R1 of readout lines RL1 and RL2 in section ⓐ. In other words, the amount of electric charge charged at the parasitic capacitance C1 varies depending on the leakage current formed by the sensing transistor PT1. In this regard, since the amount of electric charge charged when applying a selective signal gradually moves to the readout lines RL1 and RL2, an output signal corresponding thereto is outputted from the sensing transistor PT1. When the output signal is detected through the readout lines RL1 and RL2, the contact condition of the upper part of each contact sensor SN may be known.

When the pattern change of the potential R1 detected by the readout lines RL1 and RL2 is delivered to a separate IC chip, through the corresponding pattern, whether contact is made for the corresponding pixel and contact area, etc. may be determined. In other words, as the readout lines RL1 and RL2 receive a signal corresponding to the amount of electric charge charged at the parasitic capacitance C1 by the leakage current of the sensing transistor of the contact sensor SN as potential, whether contact is made and contact condition may be determined through the potential received as above.

According to an embodiment of the present invention, the contact sensor SN includes only one sensing transistor PT1. This means that the contact sensor of the present invention uses one transistor and one capacitor less than the contact sensor in the comparative example explained with reference to FIGS. 3 & 4. As mentioned above, the contact sensor SN is formed on the substrate forming the display area. For the same reasons as above, as elements constituting the contact sensor SN decrease, the aperture ratio in the entire display panel would be significantly improved.

Also, with regard to the contact sensor in the comparative example, the source electrode potential V1 of the sensing transistor PT1 should be reset periodically. However, according to an embodiment of the present invention, since the source electrode potential V1 of the sensing transistor PT1 is reset by a readout line reset signal (RL reset) applied to the readout lines (RL1, RL2) during the section where a selective signal applied to the scan lines (SL1~SLn) is at low level, no separate reset signal is required, and accordingly, the area of the integrated circuit may be decreased.

With regard to the display apparatus integrated with a contact sensor, as the contact sensor is included a display apparatus for each pixel, whether contact is made for each pixel and the contact area may be confirmed. Accordingly, fingerprint recognition becomes possible by determining whether the ridge or valley of the fingerprint made contact for each pixel when the user's finger makes contact, in addition to determining whether a touch is made by a touch generating means on the display apparatus and the point where touch is made.

That is, by forming the size of each contact sensor integrated with the display apparatus and the distance between each of them to be small enough to distinguish the ridge and valley of the fingerprint, it may be possible to detect touch and recognize fingerprints on the display apparatus. Also, when detecting whether a touch is made, the resolution is improved as well.

FIG. 9 is a view for explaining a method performing fingerprint recognition for a display apparatus having an image scanning function according to an embodiment of the present invention. FIG. 10 is a graph illustrating a difference in the property of the contact sensor according to wavelength area of light source in a method for recognizing fingerprint according to an embodiment of the present invention.

Referring to FIG. 9, a back light unit is arranged at the lower part of the first substrate 210 of the display apparatus explained with reference to FIG. 2*a*. Together with this back light unit, the display apparatus may further include a light source for a sensor 900.

The light source for a sensor 900 may include a plurality of light sources having different wavelength areas. For example, the light source of a sensor may include a red light source, a green light source, a blue light source, and a white light source. Also, the light source for a sensor 900 may include a light source providing, for example, light in the infrared ray area, not in the visible ray area.

When the fingerprint recognition function is activated by an application installed in the electronic equipment 10 (refer to FIG. 1), the user contacts his finger on a specific area. In this case, the light source for a sensor 900 activates the light source of different wavelength areas one by one in order. The light illuminated from the light source for a sensor 900 is received at the contact sensor by being reflected by the ridge or fingerprint of the finger. However, even if the light is reflected on the same point, the property of the light received with the contact sensor may vary according to the wavelength area of the light illuminated from the light source for a sensor 900. When the property of the light received with the contact sensor varies, the electric value formed at the sensing transistor included in the contact sensor varies accordingly.

Referring to FIG. 10, it may be understood that the property of change in drain-source current $I_{DS}$ according to the gate-source voltage $V_{GS}$ of the sensing transistor may vary according to the wavelength area of the light source used.

According to an embodiment, a contact sensor may be configured by setting a wavelength area of the light received with the contact sensor in the design step of the electronic equipment 10 and using a sensing transistor made of a material receiving the corresponding wavelength area more efficiently.

According to another embodiment, fingerprint recognition is performed over a plurality of times using a light source for a sensor 900 having various wavelength areas. Whenever using a light source having different wavelength areas, the fingerprint is scanned in order from the top to bottom. Specifically, as illustrated in FIG. 1, by illuminating a light source from the top of a fingerprint to the bottom, or in the reverse direction, a light reflected by the ridge or valley of the fingerprint is detected by a contact sensor and is output as the electric signal. Accordingly, a fragment fingerprint image parallel in the transverse direction of the finger is obtained from the top of the finger to the bottom, and a complete fingerprint image is obtained by combining the fragment fingerprint images. When obtaining a fingerprint image having different properties using a light source of different wavelength areas, the final fingerprint image may be obtained by combining output signals respectively detected for light illuminated in different wavelength areas or comparing and synthesizing each fingerprint image.

As a result, it becomes possible to obtain a more accurate fingerprint image because a plurality of fingerprint images is obtained using a light source having different wavelength areas, and the final fingerprint image is obtained by comparing them.

Although the exemplary embodiments of the present disclosure have been disclosed for illustrative purposes, those skilled in the art will appreciate that various modifications, additions and substitutions are possible, without departing from the scope and spirit of the present disclosure as disclosed in the accompanying claims. Therefore, it should be understood that the forgoing description is by way of example only, and is not intended to limit the present disclosure. For example, each constituent explained in singular form may be carried out being dispersed, and likewise, constituents explained as being dispersed may be carried out in combined forms.

The scope of the present disclosure is defined by the foregoing claims, and it is intended that the present disclosure covers the modifications or variations of the present disclosure provided they come within the scope of the appended claims and their equivalents.

EXPLANATION OF REFERENCE NUMERAL

210: First substrate
220: Thin-film transistor layer
230: Liquid crystal layer
240: Color filter layer
250: Second substrate
260: Cover window
270: Protective layer
300: Sensor array layer
SN: Contact sensor
SL: Scan line
RL: Readout line
VDD: Input voltage line
T1: Switching transistor
PT1: Sensing transistor
C1: Sensing capacitor

What is claimed is:

1. A display apparatus capable of image scanning, comprising:
   a plurality of contact sensors, each of them being arranged so as not to overlap a unit color pixel of a color filter layer and including only one sensing transistor generating a leakage current corresponding to a strength of light reflected from an outside object;
   a scan line applied with a selective signal selecting at least a part of the contact sensors among the plurality of contact sensors; and
   a readout line receiving an output signal corresponding to an amount of electric charge charged in a parasitic capacitance of the sensing transistor by the leakage current from the sensing transistor applied with the selective signal,
   wherein the parasitic capacitance accumulates the electric charge generated from the sensing transistor when the selective signal is not applied to the sensing transistor.

2. The display apparatus of claim 1, wherein a gate electrode and a drain electrode of the sensing transistor are connected to the scan line and readout line, respectively.

3. The display apparatus of claim 1, wherein the parasitic capacitance is a gate-source overlap capacitance of the sensing transistor.

4. The display apparatus of claim 1, wherein a sensing transistor source electrode potential of the contact sensor increases according to the coupling phenomenon by the parasitic capacitance according to the selective signal applied.

5. The display apparatus of claim 1, wherein the plurality of contact sensors are arranged at an upper side or a lower side of a color filter layer extracting color in pixel unit from a light of a backlight source.

6. The display apparatus of claim 1, wherein the plurality of contact sensors are arranged between one of a first substrate and a second substrate forming the display apparatus and a cover window protecting the display apparatus.

7. The display apparatus of claim 1, wherein the plurality of contact sensors are arranged at an upper part of a cover window protecting the display apparatus, and a protective layer for protecting the contact sensors is formed at an upper part of the plurality of contact sensors.

8. The display apparatus of claim 1, wherein the plurality of contact sensors are arranged on the same layer as a thin film transistor layer where driving circuits for driving the display apparatus are formed.

9. The display apparatus of claim 1, wherein a source electrode of the sensing transistor is reset by applying a reset signal to the readout line when the selective signal is not applied.

10. The display apparatus of claim 1, further comprising an IC chip determining whether contact is made to an upper part of the plurality of contact sensors and contact condition based on the output signal from a plurality of contact sensors detected by the readout lines.

11. A display apparatus capable of image scanning, comprising a plurality of contact sensors, each of them being arranged in an area not overlapping a unit color pixel area of a color filter layer in matrix form, wherein each of the contact sensors comprises:
a sensing transistor generating an electric current corresponding to a strength of light reflected from an outside object; and
a parasitic capacitance accumulating an electric charge generated from the sensing transistor when a selective signal is not applied to the sensing transistor,
wherein an output signal is outputted based on the electric charge accumulated in the parasitic capacitance when the selective signal is applied to the sensing transistor.

12. The display apparatus of claim 11, further comprising:
a scan line applying the selective signal to a gate electrode of the sensing transistor; and
a readout line connected to a drain electrode of the sensing transistor, for detecting a signal outputted from the sensing transistor applied with the selective signal.

13. A method for scanning image in a display apparatus, the method comprising:
charging a parasitic capacitance of a sensing transistor included in each of a plurality of contact sensors and generating a leakage current corresponding to a strength of light reflected from an outside object by applying a selective signal of a low level to each of at least a part of the plurality of contact sensors, each of them being arranged in an area not overlapping a unit color pixel area of a color filter layer in matrix form;
increasing a source electrode potential of the sensing transistor by a coupling of the parasitic capacitance by applying the selective signal of a high level to the at least a part of contact sensors; and
determining whether contact is made to the plurality of contact sensors and contact condition by detecting an output signal varying depending on an increase of the source electrode potential from contact sensors applied with the selective signal of a high level.

14. The method of claim 13, further comprising:
resetting a readout line connected to the drain electrode after the source electrode potential of the sensing transistor becomes the same as a drain electrode potential output with the output signal, after detecting the output signal.

15. The method of claim 14, further comprising:
resetting the source electrode potential of the sensing transistor by applying a reset signal to the readout line when applying the selective signal of a low level.

* * * * *